(12) United States Patent
Cazals et al.

(10) Patent No.: US 7,240,877 B2
(45) Date of Patent: Jul. 10, 2007

(54) MULTI-ENGINED AIRCRAFT WITH LOWERING SHAFT

(75) Inventors: Olivier Cazals, Daux (FR); Jaime Genty De La Sagne, Toulouse (FR); Denis Rittinghaus, Toulouse (FR)

(73) Assignee: Airbus France, Toulouse (FR)

( * ) Notice: Subject to any disclaimer, the term of this patent is extended or adjusted under 35 U.S.C. 154(b) by 92 days.

(21) Appl. No.: 11/179,611

(22) Filed: Jul. 13, 2005

(65) Prior Publication Data

US 2006/0011779 A1    Jan. 19, 2006

(30) Foreign Application Priority Data

Jul. 15, 2004  (FR) ................................. 04 07864

(51) Int. Cl.
*B64D 27/00* (2006.01)
(52) U.S. Cl. ...................................................... 244/54
(58) Field of Classification Search ................. 244/54, 244/55; 248/554
See application file for complete search history.

(56) References Cited

U.S. PATENT DOCUMENTS

| 2,815,184 A | 12/1957 | Westphal et al. |
| 2,944,766 A | 7/1960 | Freeding et al. |
| 3,041,016 A | 6/1962 | Heath |
| 3,194,515 A | 7/1965 | Cohan |
| 3,666,211 A | 5/1972 | Cathers et al. |
| 4,150,802 A * | 4/1979 | Evelyn et al. ................. 244/54 |

FOREIGN PATENT DOCUMENTS

FR          1047027         12/1953

* cited by examiner

*Primary Examiner*—Tien Dinh
(74) *Attorney, Agent, or Firm*—Stevens, Davis, Miller & Mosher, LLP

(57) ABSTRACT

A multi-engine aircraft having one engine positioned at the tail of the fuselage may include rear tail units in a vertical longitudinal plane-of-symmetry of the fuselage. The tail engine is disposed in front of the rear tail units on the upper part of the tail of the fuselage. The tail engine is mounted, in a detachable manner, on a rigid supporting structure attached to the supporting structure of the fuselage. A lowering shaft, formed in the tail of the fuselage and plumb with the engine, is supported by the rigid supporting structure. The lowering shaft provides a passage for the engine between a high position corresponding to the operational position of the engine and a low position in which the engine is removed from the fuselage.

11 Claims, 7 Drawing Sheets

MULTI-ENGINED AIRCRAFT WITH LOWERING SHAFT

FIELD OF INVENTION

The present invention relates to a multi-engined aircraft of the type in which one of the engines is more particularly placed at the tail of the fuselage, which comprises the rear tail units, and in the vertical longitudinal plane of symmetry of the fuselage.

BACKGROUND OF THE RELATED ART

Such is the case in particular with tri-jet aircraft such as the Lockheed L1011, and the McDonnell Douglas DC-10, or MD-11., In fact, whilst two of the engines are respectively carried by the wings, the third engine is structurally and geometrically located between the horizontal tail unit with its two symmetrical stabilizers and the vertical tail unit with its vertical stabilizer disposed on the nacelle or the fairing of this third engine. Other aircraft integrate the tail engine at the end of the fuselage, directly in its structure.

Whatever the type of aircraft equipped with such an engine at the tail of the fuselage may be, particular maintenance problems arise due to the location of said engine compared with that of a very accessible and easily removable wing engine. In fact, when it is desired to remove the engine for an important overhaul, or even to replace it, it is necessary to previously carry out the removal of numerous surrounding components and devices that are independent of the engine in order to gain access to the latter, which results in particularly long, tedious and costly interventions.

Furthermore, it is necessary to provide complex and heavy lifting and/or handling installations (considering the height of the intervention) in order to be able to carry out in complete safety the various movements (horizontal and vertical) for taking out and moving the engine from the rear tail units or the fuselage to a receiving stand placed on the ground.

SUMMARY OF THE INVENTION

The purpose of the present invention is to overcome these disadvantages.

For this purpose, the multi-engined aircraft of which one of the engines is positioned at the tail of the fuselage, which comprises the rear tail units, and in the vertical longitudinal plane of symmetry of said fuselage, is noteworthy, according to the invention, in that said tail engine is disposed in front of said rear tail units, on the upper part of the tail of the fuselage, in that said tail engine is mounted, in a detachable manner, on a rigid supporting structure attached to that of said fuselage and in that there is formed, in the tail of said fuselage and plumb with said engine supported by said structure, a vertical lowering shaft for the passage of said engine between, on the one hand, a high position corresponding to the operational position of said engine and, on the other hand, following the separation of said engine from the supporting structure and its displacement through said lowering shaft, a low position in which said engine has come out of said fuselage and is under said tail.

Thus, due to the invention, after its separation from the supporting structure, it is possible to lower the engine directly through the lowering shaft forming a passageway, in order to overhaul or replace it, without having to carry out the dismantling of numerous appended components or devices or having to resort to kinematics with several movements and, therefore, to complex handling installations in order to bring it onto a receiving stand, since only a single straight vertical movement is necessary, which consequently makes it possible to reduce intervention times and costs.

In a preferred embodiment, said supporting structure comprises at least one beam from which said engine is suspended by means of fixing attachments, and structural arches supporting said beam and attached to the structure of said fuselage. The particularly simple but mechanically rigid design of such a structure whose arches make it possible to bring the tail engine above the upper part of the fuselage is noted. Geometrically, said beam of the support structure is disposed substantially horizontally in said plane of symmetry and said structural arches are parallel with each other and perpendicular to said beam which they support.

More particularly, said aligned structural arches have the shape of an inverted U passing over the top of said engine, the side members of each arch being integral with the structure of the fuselage and said beam from which said engine is suspended via the fixing attachments is attached to the outside of the rounded tops of the inverted U-shaped arches.

For safety reasons, said beam is preferably a double beam and comprises two identical beans fitted one against the other. Thus, if one of the beams fails, the other one withstands.

Furthermore, for the passage of the tail engine between its two positions through the lowering shaft of the fuselage, corresponding openings are provided in the upper and lower parts respectively of said fuselage, plumb with said engine.

Preferably, the upper part of the tail of the fuselage, upon which said engine is placed, has a flattened configuration.

In a preferred embodiment, the rear tail units define a channel, for example substantially U-shaped, that is geometrically symmetrical with respect to the plane of symmetry of the fuselage, the tail engine thus being disposed in front of said U-shaped channel.

In particular, said opening formed in the lower part of the fuselage is obturated by a hatch, articulated on the structure of said fuselage and defining, when it is lowered, an access stairway to the inside of the fuselage. The opening of the hatch or its withdrawal from the fuselage if it is detachable then allows the lowering (or raising) of the tail engine via said shaft.

The engine is furthermore confined in a nacelle attached in a fixed manner to the upper part of said fuselage. Thus, the upper opening is surrounded by the nacelle. For example, said nacelle can comprise a forward air-intake cowl for said engine, a detachable central cowl disposed around the fan of the engine, and a detachable rear cowl disposed around the turbine, said cowls being fixed to the upper part of said fuselage and surrounding its upper opening.

According to another feature, a box-type structure can be fitted in said lowering shaft of said fuselage, at the place where the engine passes through the latter, for example for purposes of maintenance directly on board the aircraft or for the purpose of transporting freight and/or luggage.

BRIEF DESCRIPTION OF DRAWINGS

The figures of the appended drawing will give a good understanding of how the invention may be embodied. In these figures, identical references refer to similar components.

DETAILED DESCRIPTION OF INVENTION

Figure 1:
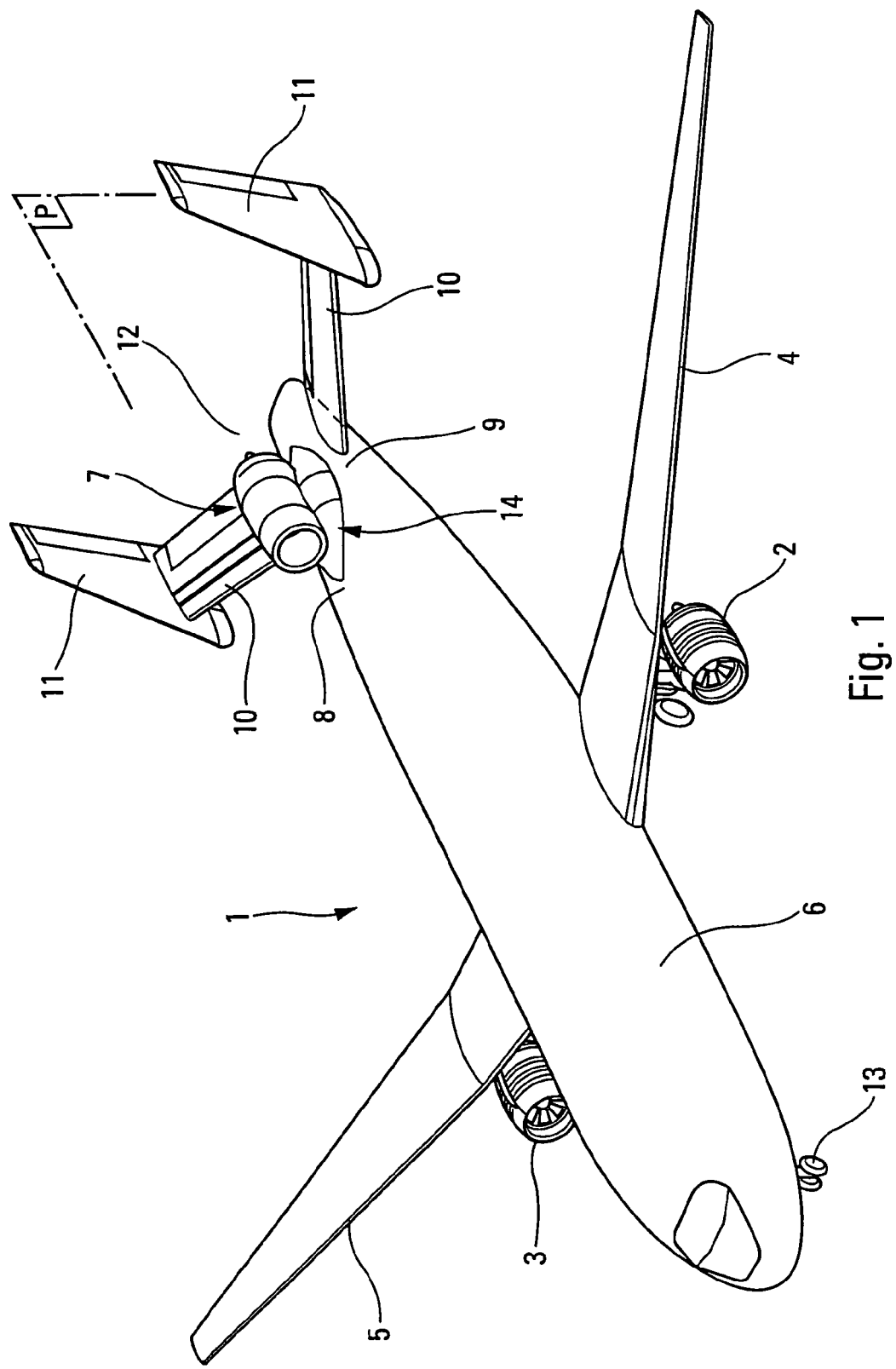
FIG. 1 is a perspective view of a multi-engined aircraft according to the invention, comprising an engine at the tail of the fuselage.
Figure 2:
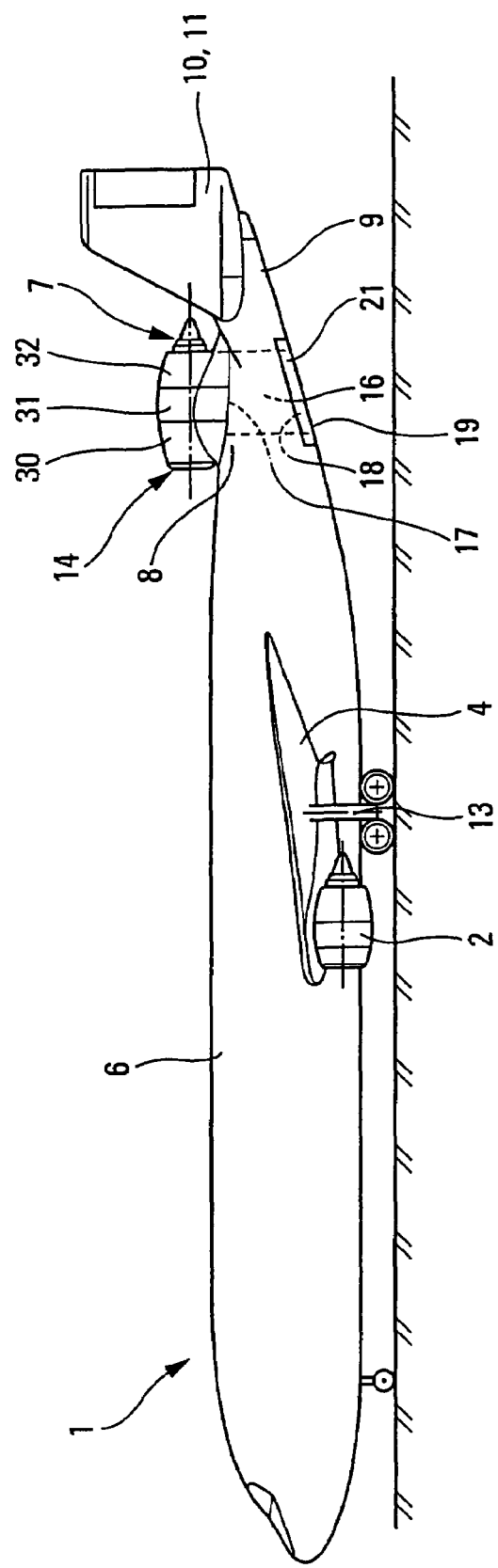
FIG. 2 is a side view of the aircraft shown in FIG. 1.

In the example embodiment shown in FIGS. 1 and 2, the aircraft 1 comprises three engines of the turbojet type. Two of the engines, referenced 2 and 3, are disposed under the wings 4, 5 of the fuselage 6 respectively symmetrically with respect to the vertical longitudinal plane of symmetry P of the latter and the third engine 7 is provided in this plane of symmetry P and at the level of the tail 9 of the fuselage, which comprises the horizontal 10 and vertical 11 rear tail units. The reference 13 refers to the landing gear of the aircraft.

The tail engine 7 is advantageously situated on the upper part 8 of the tail 9 and in front of the horizontal and vertical tail units which therefore define a substantially U-shaped channel 12 in this example, geometrically symmetrical with respect to the longitudinal plane P of the fuselage (the rear tail units defining the channel could also be H-shaped or V-shaped). Thus, as the outlet of the engine 7 is at the entrance of the U-shaped channel of the tail units 10, 11, in the plane of symmetry, the emitted gasses are directed inside of the channel, without harming the tail units.

It can furthermore be seen in these FIGS. 1 and 2 that the engine 7 is surrounded by a nacelle or fairing 14 attached to the fuselage and that it is raised with respect to the upper part 8 of the tail 9 of the fuselage, this part being flattened.

Figure 3:
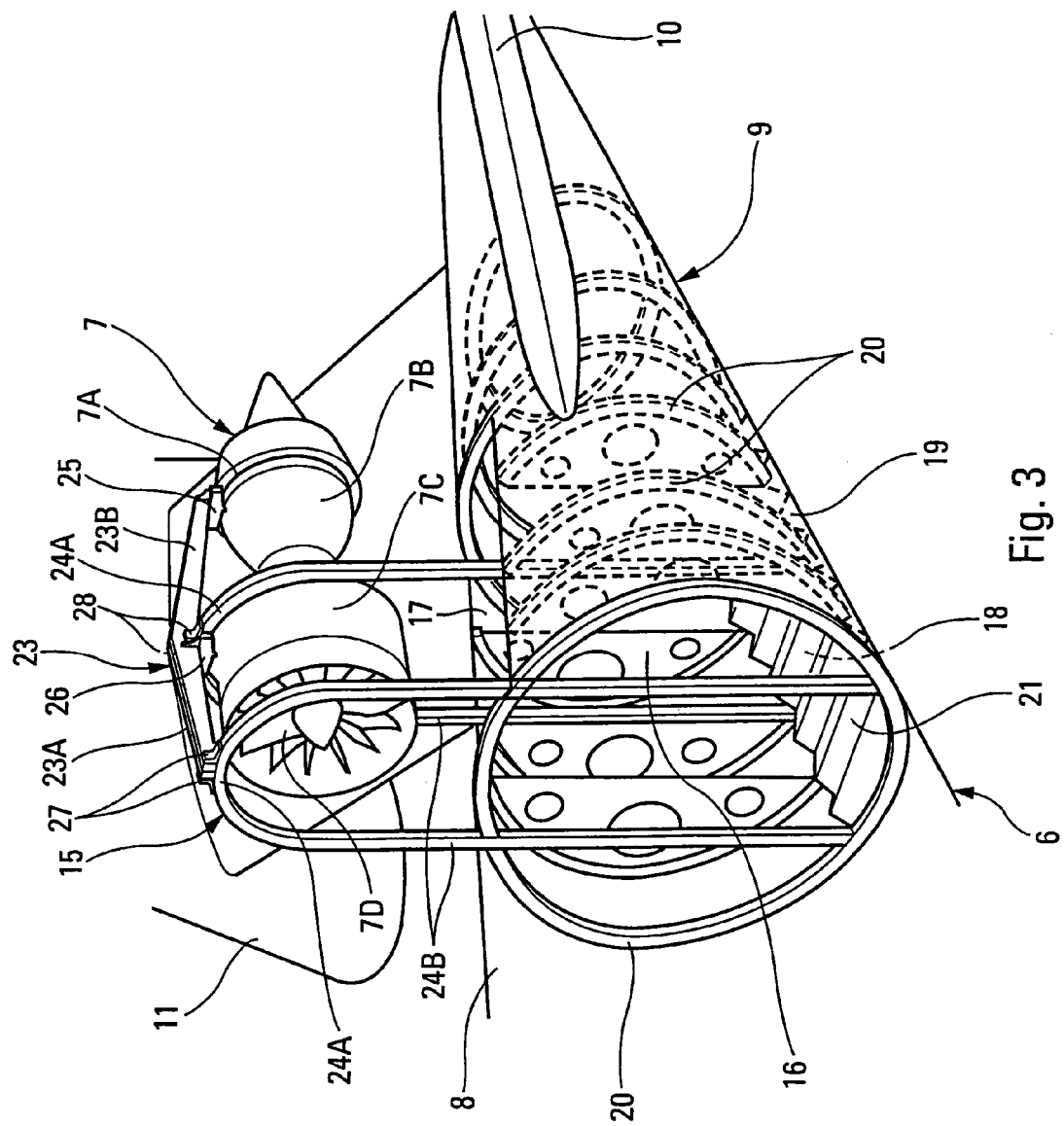
FIG. 3 is a diagrammatic representation in perspective of the tail engine assembly on the structure of the fuselage.

As shown more particularly in FIG. 3, in which the nacelle 14 has not been shown, the engine 7 is mounted, in a detachable manner, on a rigid supporting structure 15 connected with that of the fuselage which is defined, among other things, by structural frames 20. A vertical lowering shaft 16 is then formed in the tail 9 of the fuselage, plumb with the engine 7 and in the plane of symmetry, in order to allow its passage between its high position, in which it is operational and attached to the supporting structure 15, and a low position, in which it has been taken out of the fuselage through the shaft 16 for the purpose of maintenance or replacement.

In order to freely ensure the passage of the engine 7 inside the lowering shaft 16, arrangements are provided at the level of the tail structure 9 of the fuselage. Corresponding openings 17 and 18 are formed in the upper part 8 and in the lower part 19 of the tail 9 of the fuselage and located plumb with said engine 7. These openings 17, 18 have a substantially rectangular shape in plan-view and have dimensions larger than those of the engine to allow its passage. The structural frames 20 of the fuselage, at the level of the shaft 16, are therefore partial and reinforced in order not to harm the rigidity of the fuselage.

In FIGS. 1 to 3, it can be seen that the lower opening 18 is obturated by a hatch 21 articulated on the structure of the fuselage 6 and merging with its profile and which is, in this example, detachable. The hatch 21 can therefore be withdrawn from the fuselage when it is desired to proceed with the lowering of said engine, as will be seen below, or simply lowered to reveal a stairway 22, when it is desired to gain access to the inside of the fuselage. In a variant that is not shown, the hatch could be made in two parts (doors or flaps) that are symmetrical with respect to the longitudinal plane of the aircraft and without a stairway. The two parts are articulated laterally on the fuselage, like some landing gear hatches, and are not detachable. With regard to the upper opening 17, this can be left as it is since it is surrounded by the bottom part of the nacelle 14, which is attached in a fixed manner to the upper flattened part 8 of the fuselage. It could also be obturated.

In the diagrammatic embodiment shown in FIG. 3, the supporting structure 15 comprises a double beam 23 supporting the engine 7 and two structural arches 24 supporting the double beam (the structure could also be of the box-sectioned or trellis type). In particular, the double beam 23 is positioned horizontally in the plane of symmetry P and consists of two identical and substantially straight beams 23A, 23B, disposed one against the other. From this double beam 23 is suspended the engine 7 by fixing attachments 25, 26, one of which 25 is provided at the rear end of the double beam (at the right hand end in FIG. 3) and supports the outer casing 7A of the turbine 7B of the engine and the other of which 26 is situated in the median section of the double beam and supports the external casing 7C of the fan 7D.

With regard to the structural arches 24, these are identical and have the shape of an inverted U, whilst being disposed in planes perpendicular to the plane of symmetry P of the fuselage. The double beam 23 is attached to the rounded tops of the arches 24A by means of fixing attachments, one of which 27 is provided at the front end of the double beam (at the left hand end in FIG. 3) and the other of which 28 is situated in the median or central section of the latter, beside the engine attachment 26. For safety purposes, the fixing attachments 25, 26, 27 and 28 are duplicated in the same way as the beam is.

The inverted U-shaped arches straddle the engine 7 and their lateral members 24B are attached in a fixed manner to the structural frames 20 of the fuselage. Thus, the arches participate in the rigidifying of the structure of the fuselage and the length of the members makes it possible to bring the engine easily above the upper part 8 of the fuselage.

Figure 4:
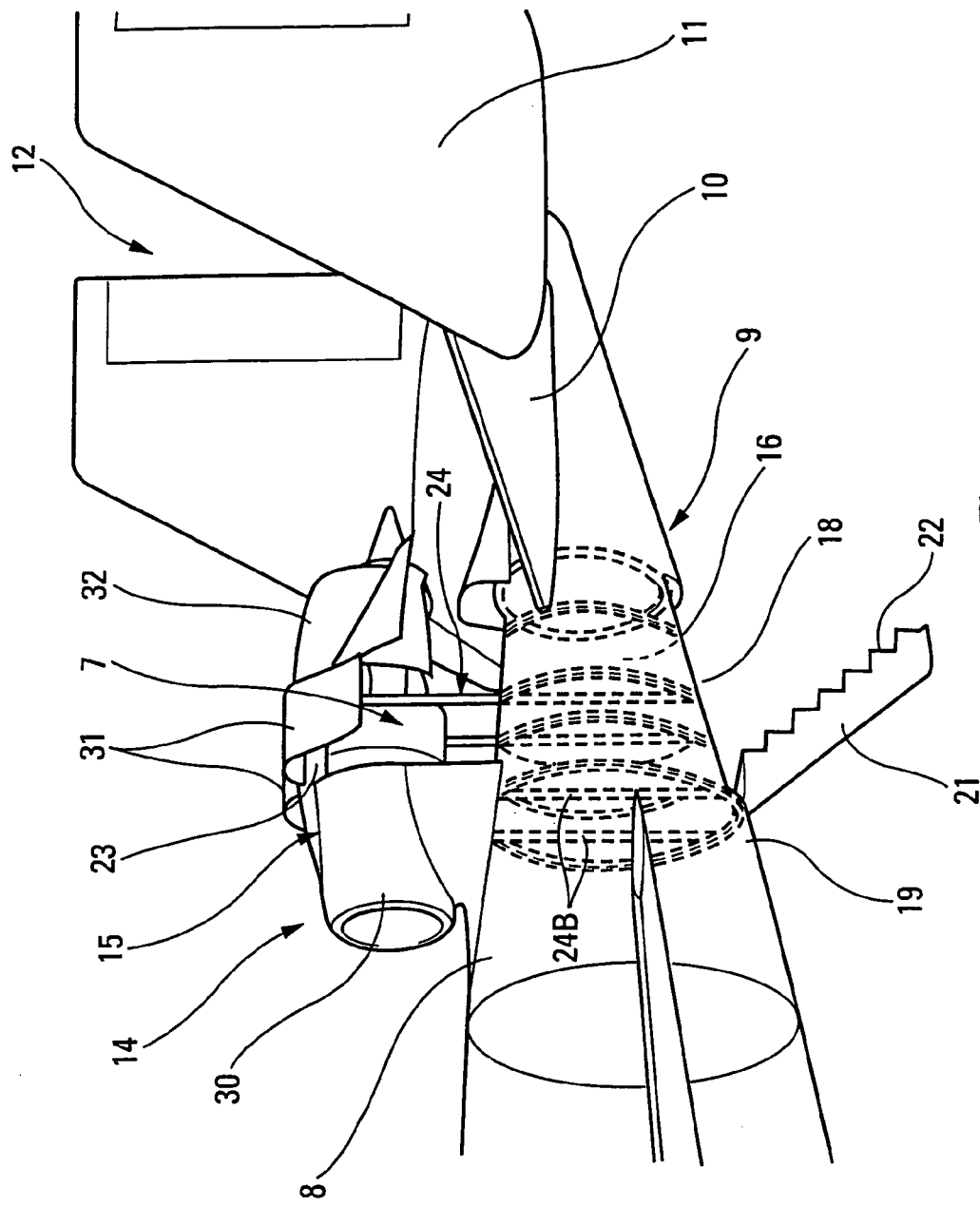
FIGS. 4 to 6 diagrammatically show the sequences of lowering the tail engine through the fuselage.

Furthermore, as shown in FIGS. 1, 2 and 4, the nacelle 14 surrounding the supporting structure 15 and the engine 7 principally consists of three successive parts or cowls:

a first front air-intake cowl 30, situated in front of the fan 7D and attached in a fixed manner to the flattened upper part of the fuselage;

a central cowl 31 with two articulated flaps, surrounding the outer casing 7C of the fan and of the corresponding compressor, and attached in a fixed manner to said flattened part of the tail of the fuselage; and a rear cowl 32, also with two articulated flaps, surrounding the outer casing 7A of the turbine and attached in a fixed manner to said flattened part 8, facing the rear tail units 10 and 11.

Figure 7:
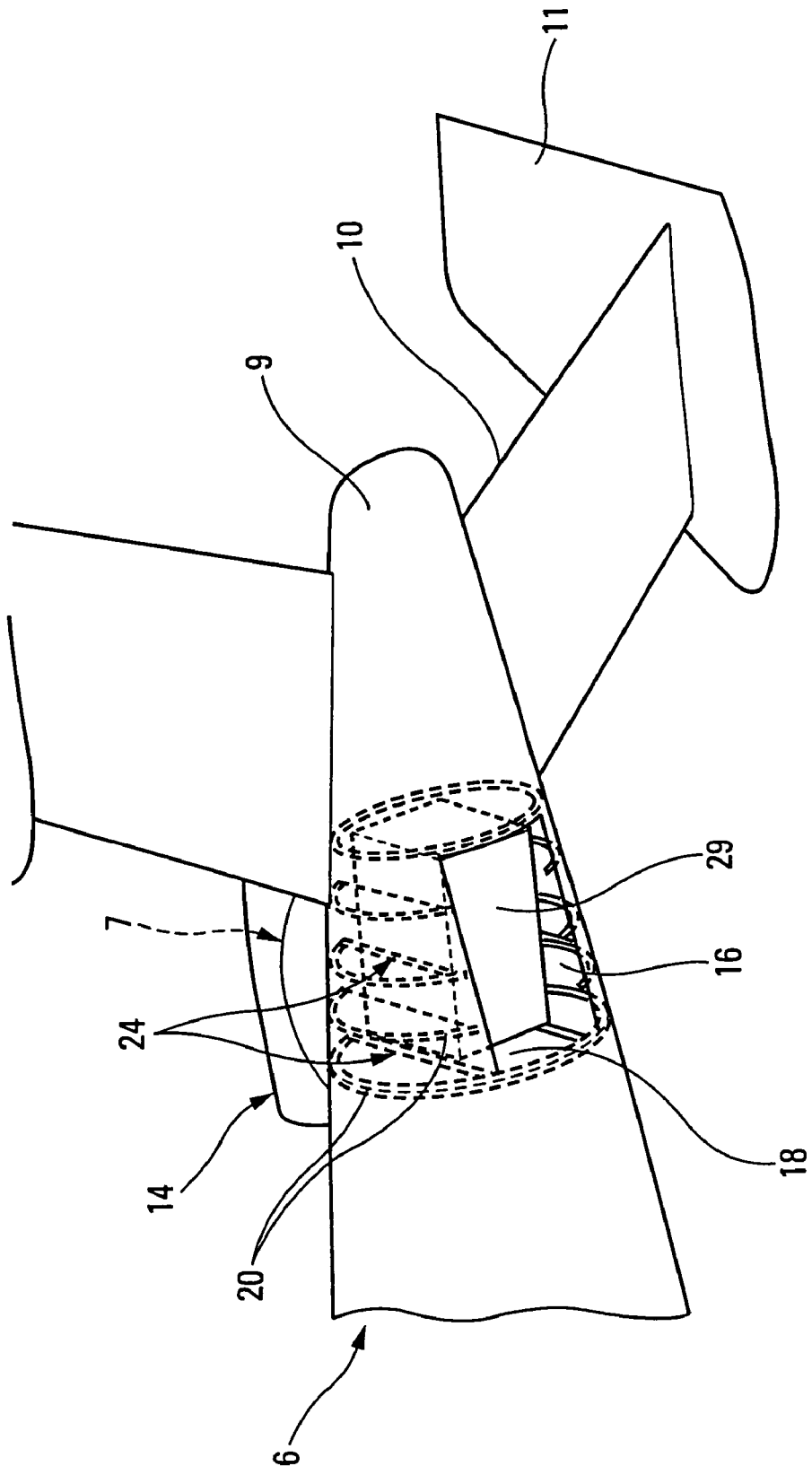
FIG. 7 is a perspective rear view from below of the tail of the fuselage.

Furthermore, in the location of the lowering shaft 16 there can be installed a box-type structure 29 as shown in FIG. 7, accessible for example from the stairway 22 integrated with the hatch 21, which is therefore lowered. This box-type structure 29 can receive technicians allowing them to carry out, in particular, maintenance operations inside the fuselage, for example on the circuits running along the latter, and on the tail engine, or it can contain freight or luggage.

When it is necessary to remove the tail engine 7, the basic procedure is as follows.

The aircraft 1 being brought to a suitable area, the lower hatch 21 is lowered and the detachable flaps constituting the central and rear cowls 31 and 32, which surround the engine 7, are raised as shown in FIG. 4. Alternatively, said cowls could be removed if necessary.

Figure 5:
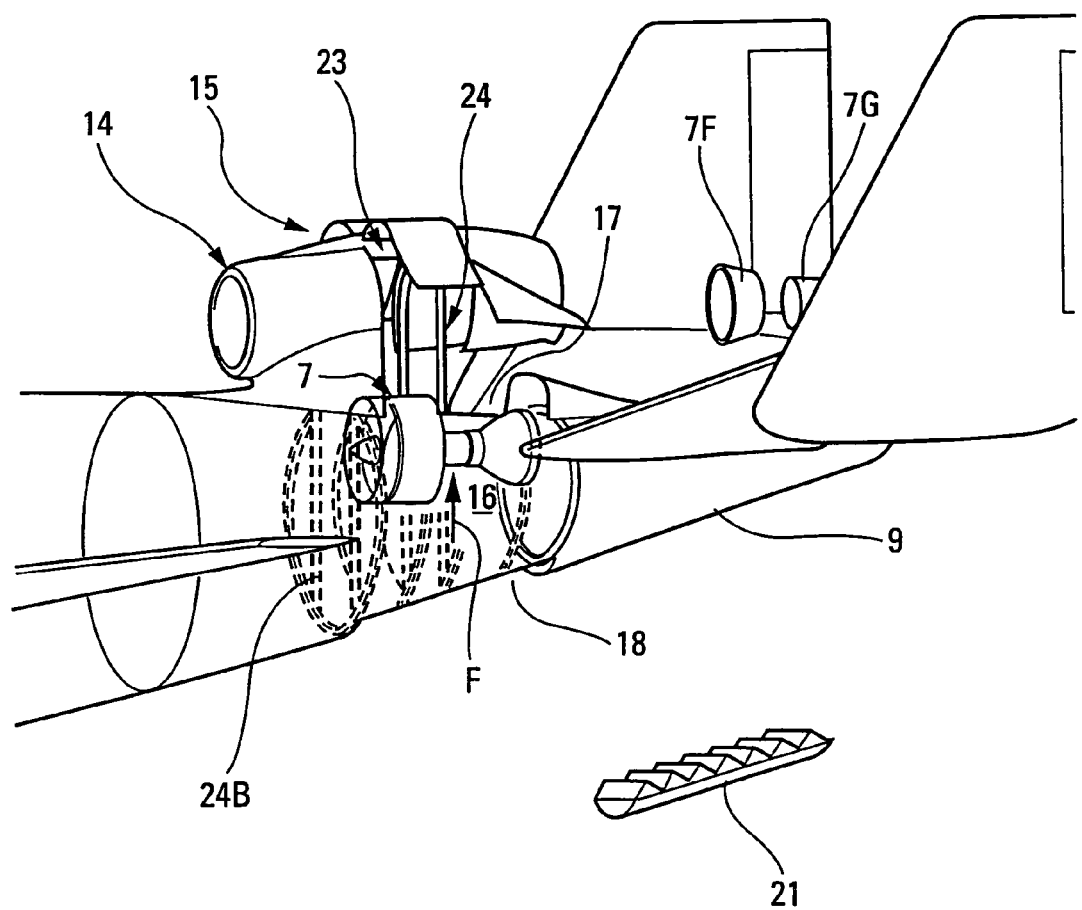

The outer ring 7F and the internal cone 7G of the nozzle are then detached from the rest of the engine as shown in FIG. 5. This dismantling, which is carried out without any particular problems, avoids having to provide passage openings and a shaft that are too large in the tail of the fuselage. The hatch 21 is furthermore removed from the fuselage 6, totally uncovering the lowering shaft 16. If the box-type structure 29 is present in the latter, it is of course removed from it.

Before the removal of the fixing attachments 25, 26 connecting the engine 7 to the double beam 23, the fluid circuits and other pieces of equipment connected to the engine are disconnected and handling equipment is brought in to lower the engine. The latter can be in the form, shown diagrammatically by an arrow F in FIGS. 5 and 6, of a motorized lifting machine equipped with extensible means (X jacks) at the end of which is a cradle structure capable of supporting the engine. The handling equipment could also be a hoist system overhanging the tail of the fuselage and allowing, by means of a simple vertical movement, the lowering (or raising) of the tail engine through the shaft.

As a variant, the double beam 23 could support the hoists making it possible to obtain total autonomy for the fitting/detachment of the engine. Thus it is no longer necessary to bring the aircraft into an appropriate hangar but a simple open area, for example, advantageously suffices.

Figure 6:
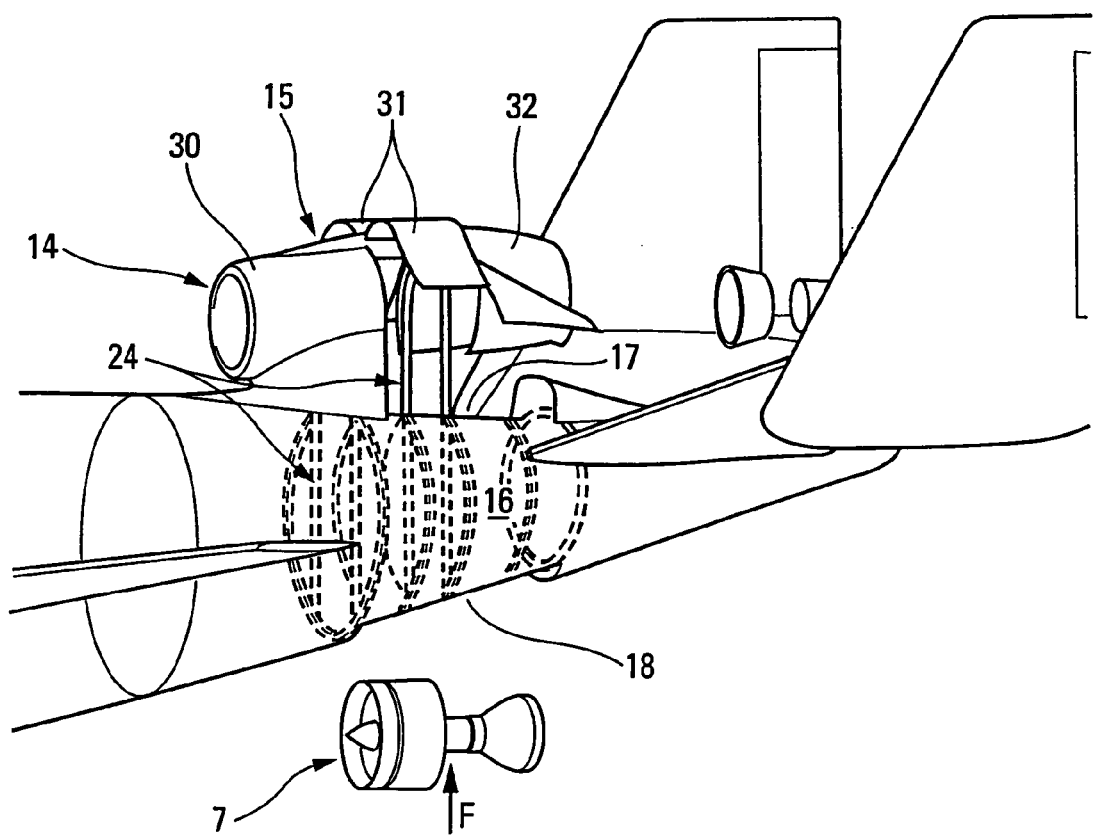

In FIG. 5, the engine is in the process of being lowered by means of the handling equipment and passes through the openings 17, 18 and the shaft 16 until it emerges from the tail 9 of the fuselage 6, as shown in FIG. 6. From there, it can be taken into specialized workshops. It can therefore be understood, from the preceding description of the invention, that the maintenance of such a tail engine situated on the upper part of the fuselage, is made particularly easy, like that of a wing engine.

The invention claimed is:

1. A multi-engined aircraft of which one of the engines is positioned at the tail of the fuselage, which comprises the rear tail units, and in the vertical longitudinal plane of symmetry of said fuselage, wherein said tail engine is disposed in front of said rear tail units, above the upper part of the tail of the fuselage, and wherein said tail engine is mounted, in a detachable manner, on a rigid supporting structure attached to that of said fuselage and wherein there is formed, in the tail of said fuselage and plumb with said engine supported by said structure, a vertical lowering shaft having an upper opening in the upper part of the tail of the fuselage and a lower opening in the lower part of the tail of the fuselage, the vertical lowering shaft for the passage of said engine between, on the one hand, a high position corresponding to the operational position of said engine and, on the other hand, following the separation of said engine from the supporting structure and its displacement through said lowering shaft, a low position in which said engine has come out of said fuselage and is under said tail.

2. The aircraft as claimed in claim 1, wherein said supporting structure comprises at least one beam from which said engine is suspended by fixing attachments and structural arches supporting said beam and attached to the structure of said fuselage.

3. The aircraft as claimed in claim 2, wherein said beam of the supporting structure is disposed substantially horizontally in said plane of symmetry and said structural arches are parallel with each other and perpendicular to said beam which they support.

4. The aircraft as claimed in claim 3, wherein said aligned structural arches have the shape of an inverted U passing over the top of said engine, the side members of each arch being integral with the structure of the fuselage and said beam from which said engine is suspended via the fixing attachments is attached to the outside of the rounded tops of the inverted U-shaped arches.

5. The aircraft as claimed in claim 2, wherein said beam is double and comprises two identical beams fitted one against the other.

6. The aircraft as claimed in claim 1, wherein said opening formed in the lower part of the fuselage is obturated by a hatch, articulated on the structure of said fuselage and defining, when it is lowered, an access stairway to the inside of the fuselage.

7. The aircraft as claimed in claim 1, wherein the upper part of the tail of the fuselage, upon which said engine is placed, has a flattened configuration.

8. The aircraft as claimed in claim 1, wherein said rear tail units define a channel that is geometrically symmetrical with respect to the plane of symmetry of the fuselage.

9. The aircraft as claimed in claim 1, wherein said engine is surrounded by a nacelle attached in a fixed manner to the upper part of said fuselage.

10. The aircraft as claimed in claim 9, wherein said nacelle comprises a forward air-intake cowl for said engine, a detachable central cowl disposed around the fan of the engine, and a detachable rear cowl disposed around the turbine, said cowls being fixed to the upper part of said fuselage and surrounding its upper opening.

11. The aircraft as claimed in claim 1, wherein a box type structure is fitted in said lowering shaft of said fuselage, at the place where the engine passes through the latter.

* * * * *